(12) United States Patent
Nohara et al.

(10) Patent No.: US 6,679,801 B2
(45) Date of Patent: Jan. 20, 2004

(54) ECCENTRIC OSCILLATING-TYPE SPEED REDUCER

(75) Inventors: Osamu Nohara, Gifu (JP); Katsuhiko Yokoyama, Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/241,053

(22) Filed: Sep. 10, 2002

(65) Prior Publication Data

US 2003/0054912 A1 Mar. 20, 2003

(30) Foreign Application Priority Data

Sep. 13, 2001 (JP) .................................... P2001-277509

(51) Int. Cl.[7] .............................. F16H 1/32; F01M 9/00
(52) U.S. Cl. ..................... 475/179; 475/177; 184/6.12
(58) Field of Search ............................... 475/162, 168, 475/176–179; 184/6.12

(56) References Cited

U.S. PATENT DOCUMENTS

| | | | | | |
|---|---|---|---|---|---|
| 3,129,611 A | * | 4/1964 | Lee | ......................... | 475/179 X |
| 4,239,977 A | * | 12/1980 | Strutman | ...................... | 290/44 |
| 4,683,985 A | * | 8/1987 | Hultgren | ..................... | 184/6.12 |
| 5,908,372 A | * | 6/1999 | Janek | ........................ | 475/168 X |
| 6,508,737 B2 | * | 1/2003 | Fujimoto | ..................... | 475/178 |

FOREIGN PATENT DOCUMENTS

JP          2002-21947 A     1/2002

* cited by examiner

*Primary Examiner*—Roger Pang
(74) *Attorney, Agent, or Firm*—Akin Gump Strauss Hauer & Feld, L.L.P.

(57) ABSTRACT

Axial positions of two driven external gears 66 making up each of a plurality of paired-gear groups 67 with respect to an input shaft 62 are made identical, and a different paired-gear group 67 is arranged by being offset in the axial direction of the input shaft 62. Therefore, only two driven external gears 66 making up the paired-gear group 67 are present at an identical axial position of the input shaft 62. Consequently, even if the diameters of these driven external gears 66 are made large up to the very limit, these driven external gears 66 do not interfere with each other. Accordingly, it is possible to readily enlarge the reduction ratio based on the driving and driven external gears 65 and 66.

8 Claims, 5 Drawing Sheets

ECCENTRIC OSCILLATING-TYPE SPEED REDUCER

BACKGROUND OF THE INVENTION

The present invention relates to an eccentric oscillating-type speed reducer for effecting speed reduction by eccentrically rotating pinions.

The present applicant proposed in Japanese Patent Application No. 2000-202030 an eccentric oscillating-type speed reducer which makes it possible to make the manufacturing cost low and make the assembling operation simple by forming a plurality of pinions by pinions of the same shape.

This eccentric oscillating-type speed reducer is comprised of an outer casing having internal teeth formed on its inner periphery; a plurality of pinions which are accommodated in the outer casing, which have on their outer peripheries external teeth meshing with the internal teeth, the number of the external teeth being slightly smaller than that of the internal teeth, and which are juxtaposed in parallel in an axial direction; an even number of not less than four crankshafts which are arranged in such a manner as to be spaced apart from each other at equal angles in a circumferential direction, central portions of the crankshafts being inserted in the pinions, so as to eccentrically rotate the pinions as the crankshafts rotate; a carrier which is inserted in the outer casing for rotatably supporting both end portions of the crankshafts; an input shaft supported rotatably by the outer casing and having a driving external gear coaxial with the internal teeth; and driven external gears respectively mounted on the crankshafts and meshing with the driving external gear while surrounding the driving external gear.

However, in the case where the number of the crankshafts is thus set to an even number of not less than four, if an attempt is made to enlarge the speed reduction ratio of the eccentric oscillating-type speed reducer by making the diameter of the driving external gear small while making the diameter of each driven external gear large, the adjacent driven external gears come to interfere with each other at a point of time when the diameter of each driven external gear has not yet been made very large. Consequently, there has been a problem in that the reduction ratio based on the driving and driven external gears cannot be made very large. For example, in a case where the number of crankshafts is four, the reduction ratio based on the driving and driven external gears has been 2.1 at maximum.

SUMMARY OF THE INVENTION

The object of the invention is to provide an eccentric oscillating-type speed reducer which makes it possible to make a final speed reduction ratio and a final output torque substantially large by enlarging the reduction ratio based on the driving and driven external gears.

The above object can be attained by an eccentric oscillating-type speed reducer including an outer casing having internal teeth formed on an inner periphery thereof; a plurality of pinions which are accommodated in the outer casing, which have on outer peripheries thereof external teeth meshing with the internal teeth, the number of the external teeth being slightly smaller than that of the internal teeth, and which are juxtaposed in parallel in an axial direction; an even number of not less than four crankshafts which are arranged in such a manner as to be spaced apart from each other at equal angles in a circumferential direction, central portions of the crankshafts being inserted in the pinions, so as to eccentrically rotate the pinions as the crankshafts rotate; a carrier which is inserted in the outer casing for rotatably supporting both end portions of the crankshafts; an input shaft supported rotatably by the outer casing and having a driving external gear coaxial with the internal teeth; and driven external gears respectively mounted on the crankshafts and meshing with the driving external gear while surrounding the driving external gear, the eccentric oscillating-type speed reducer characterized in that the driven external gears are classified into a plurality of paired-gear groups each consisting of two driven external gears spaced apart from each other by 180 degrees in the circumferential direction, axial positions of the two driven external gears making up each of the paired-gear groups with respect to the input shaft are made identical, and a different paired-gear group is arranged by being offset in the axial direction of the input shaft.

In this invention, as described above, the driven external gears are classified into a plurality of paired-gear groups each consisting of two driven external gears spaced apart from each other by 180 degrees in the circumferential direction, axial positions of the two driven external gears making up each of the paired-gear groups with respect to the input shaft are made identical, and a different paired-gear group is arranged by being offset in the axial direction of the input shaft. Therefore, only two driven external gears making up the paired-gear group are present at an identical axial position of the input shaft. Consequently, even if the diameters of these driven external gears are made large up to the very limit, these driven external gears do not interfere with each other. Accordingly, it is possible to readily enlarge the reduction ratio based on the driving and driven external gears, with the result that it is possible to substantially enlarge the final reduction ratio without lowering the final output torque in the eccentric oscillating-type speed reducer.

In addition, since the space formed between the bottom of each of the prepared holes and the tip of each of the bolts is located not in the column portion but in the base portion, the entire column portion assumes a solid structure, thereby increasing the strength and permitting the output of high torque.

In addition, the bearing and the seal member interposed between the outer casing and the input shaft can be lubricated by the lubricating oil filled in the sealed space, so that a lubricating device for lubricating the bearing and the seal member or the operation for replenishing the lubricating oil are made unnecessary.

In addition, even if the lubricating oil in the sealed space expands due to the temperature rise of the speed reducer, this expansion is absorbed by the compression of the air in the air reservoir, so that the leakage of the lubricating oil can be prevented.

The present disclosure relates to the subject matter contained in Japanese patent application No. 2001-277509 (filed on Sep. 13, 2002), which is expressly incorporated herein by reference in its entirety.

DESCRIPTION OF THE PREFERRED EMBODIMENT

Hereafter, a description will be given of the embodiments of the invention with reference to the drawings.

Figure 1:
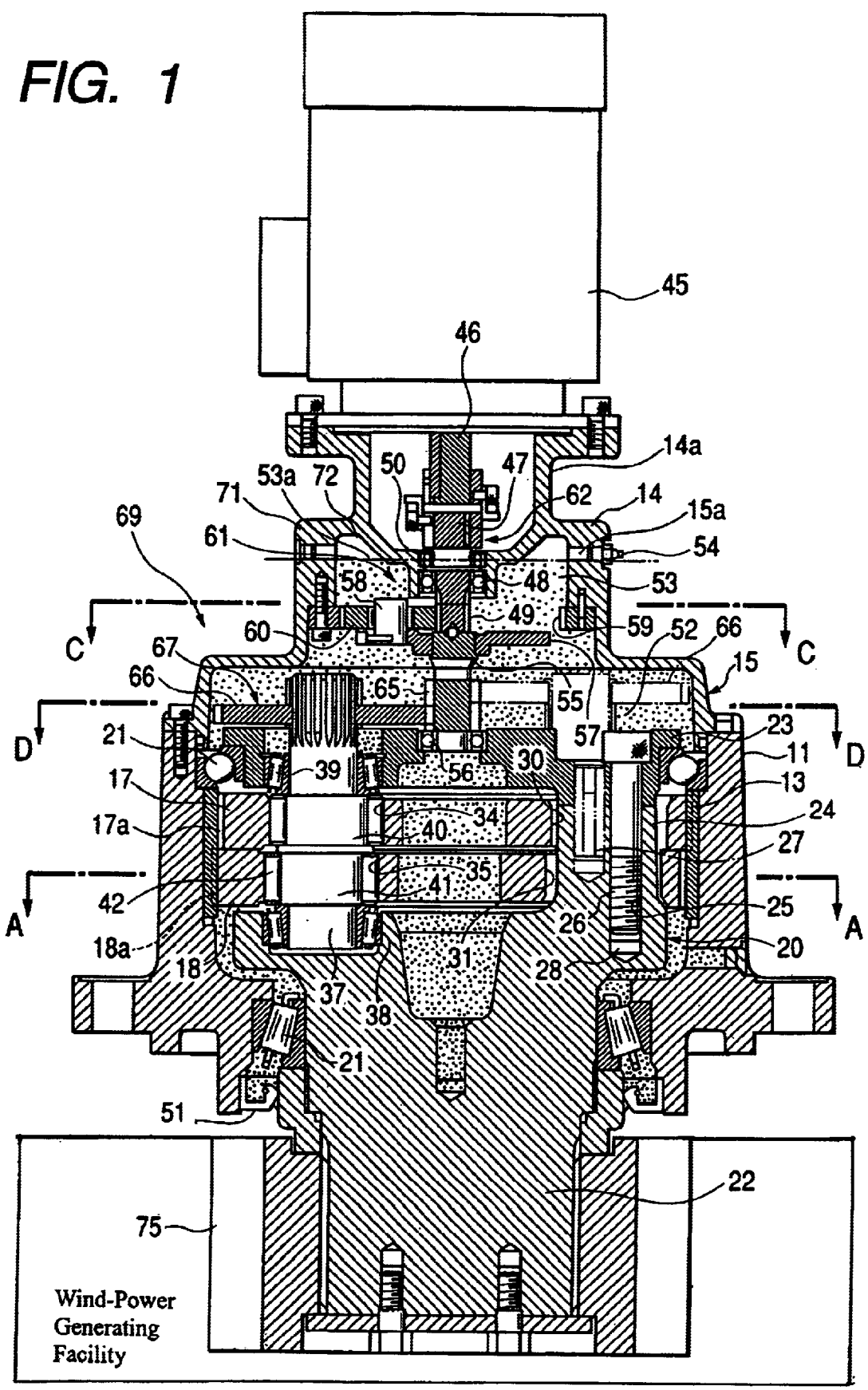
FIG. 1 is a front cross-sectional view illustrating an embodiment of the invention.
Figure 2:
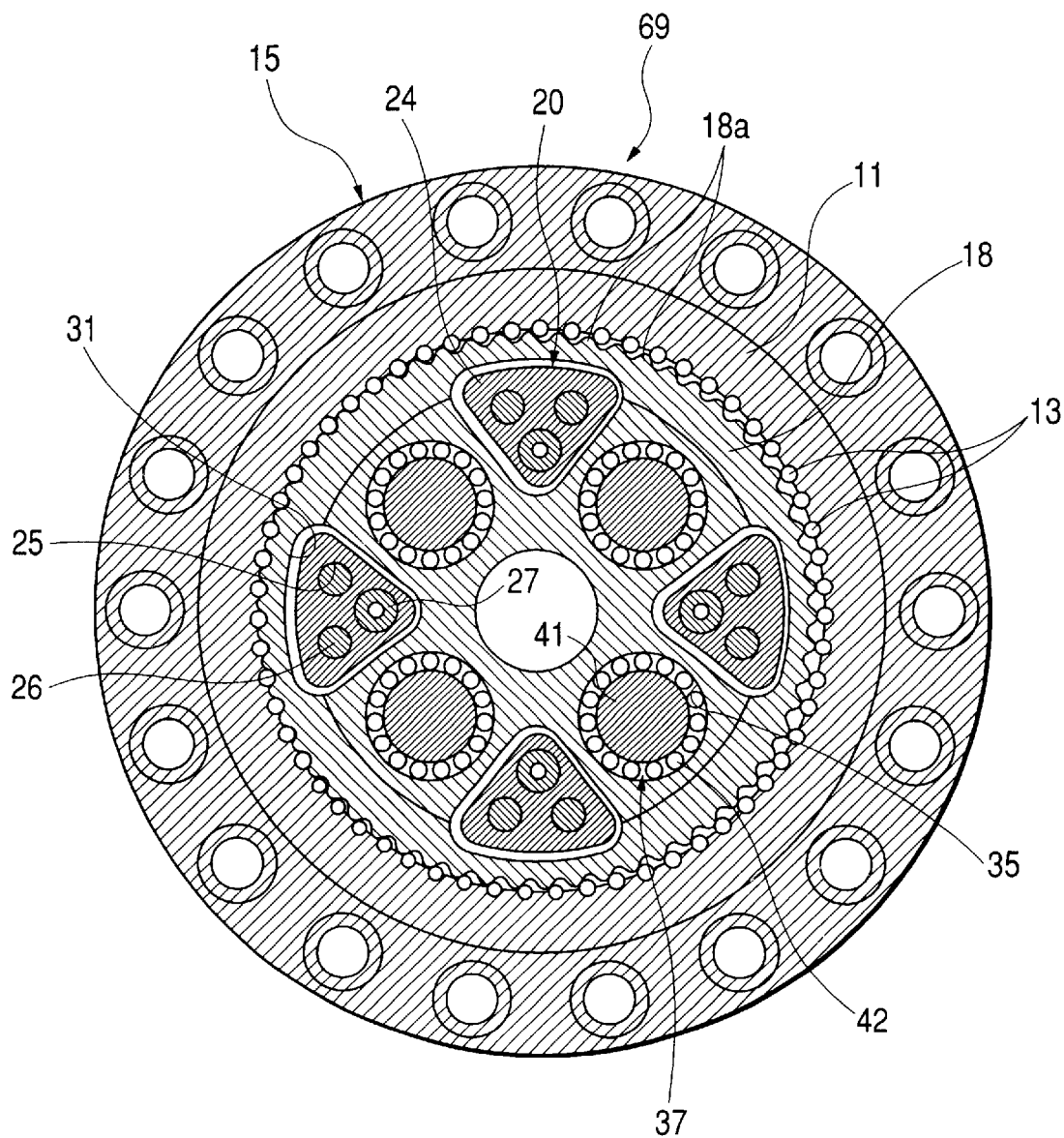
FIG. 2 is a cross-sectional view taken in the direction of the arrows along line A—A of FIG. 1.
Figure 3:
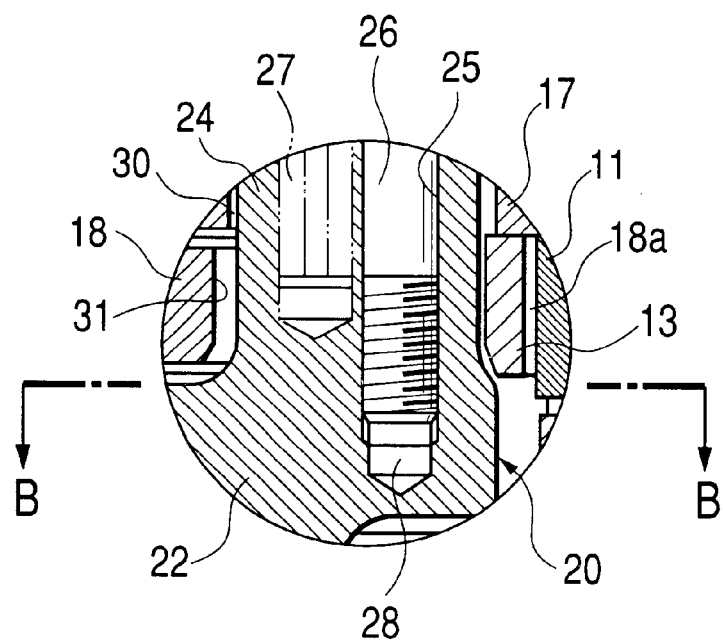
FIG. 3 is a front cross-sectional view of a column portion and its vicinities of a carrier.
Figure 4:
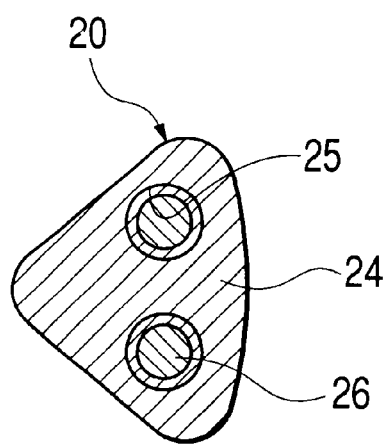
FIG. 4 is a cross-sectional view taken in the direction of the arrows along line B—B of FIG. 3.

In FIGS. 1 and 2, reference numeral 11 denotes a substantially cylindrical cylinder whose central axis extends in a perpendicular direction (vertical direction), and this cylinder 11 is attached to a fixing frame of an unillustrated wind-power generating facility. Numeral 12 denotes a plurality of internal tooth pins 13 serving as internal teeth provided on an inner periphery of a central portion of the cylinder 11, and these internal tooth pins 13 extend in the axial direction, and are arranged in such a manner as to be spaced apart from each other at equal angles in the circumferential direction.

A stepped cylindrical upper cover 14 with a bottom for closing an opening in an upper end of the cylinder 11 is fixed to the upper end of the cylinder 11, and a substantially cylindrical extension 14a for supporting a drive motor, which will be described later, is formed on an upper surface of this upper cover 14. The aforementioned cylinder 11 and the upper cover 14 as a whole form an outer casing 15 on an inner periphery of which internal teeth (internal tooth pins 13) are formed and whose lower end is open, and the upper cover 14 forms an upper wall of the outer casing 15.

Reference numerals 17 and 18 denote a plurality of, two in the illustrated case, pinions which are accommodated in the outer casing 15, and these pinions 17 and 18 are juxtaposed in such a manner as to be spaced apart from each other in the axial direction (in the vertical direction). Each of these pinions 17 and 18 has on its outer periphery outer teeth 17a, 18a whose numbers of teeth are slightly smaller than the number of teeth of the internal tooth pins 13, i.e., smaller by one in the illustrated case. These adjacent pinions 17 and 18 mesh with the internal tooth pins 13 of the cylinder 11 in a state in which their phases are offset from each other by 180 degrees.

Numeral 20 denotes a carrier whose upper end portion and central portion are inserted in the aforementioned outer casing 15 and whose lower end portion projects downward from the outer casing 15. This carrier 20 is rotatably supported by the outer casing 15 by means of a pair of bearings 21 which are spaced apart in the vertical direction (axial direction). The carrier 20 has a base portion 22 located on the lower side (one side) than the pinions 17 and 18, as well as a disk-shaped end plate portion 23 located on an upper side (the other end side) than the pinions 17 and 18. In addition, the carrier 20 has column portions 24 formed integrally on the base portion 22 and each having a substantially triangular cross section and extending axially from an upper surface thereof (the other side surface) toward the end plate portion 23. These column portions 24 are provided in an even number of not less than four, four in the illustrated case, and are arranged in such a manner as to be spaced apart from each other at equal angles in the circumferential direction.

In FIGS. 1, 2, 3, and 4, reference numeral 25 denotes a prepared hole extending downward from the upper surface (other side surface) of each column portion 24. Each of these prepared holes 25 extends through the column portion 24 of the carrier 20, and its bottom surface (lower end) is located inside the base portion 22. A plurality of bolts 26 which are inserted in the end plate portion 23 are respectively screwed into the prepared holes 25 thus formed in the column portions 24 and the base portion 22. Thus the end plate portion 23 and the column portions 24 are fastened together by the bolts 26, allowing the end plate portion 23 to be fastened to the column portions 24.

Further, tips (lower ends) of these bolts 26 are also located closer to the base portion 22 side than proximal ends (lower ends) of the column portions 24 in the same way as the prepared holes 25. Consequently, a space 28 formed between the bottom of the prepared hole 25 and the tip of the bolt 26 is located in the base portion 22. Incidentally, reference numeral 27 denotes a positioning pin inserted in both the end plate portion 23 and the column portion 24.

If the space 28 which is thus formed between the bottom of the prepared hole 25 and the tip of the bolt 26 is located not in the column portion 24 but in the base portion 22, the entire column portion 24 assumes a solid structure, thereby increasing the strength and permitting the output of high torque. Here, loosely fitting holes 30 and 31 having substantially triangular cross sections and provided in numbers (four) equivalent to those of the column portions 24 are respectively formed in the pinions 17 and 18 in such a manner as to be spaced apart from each other in the circumferential direction. The column portions 24 of the carrier 20 are respectively passed through the loosely fitting holes 30 and 31 of these pinions 17 and 18 in the axial direction in a loosely fitted state. In addition, the above-described base portion 22, end plate portion 23, column portions 24, and bolts 6 as a whole constitute the carrier 20.

Referring to FIGS. 1 and 2 again, through holes 34 and 35 which are spaced apart at equal angles in the circumferential direction are respectively formed in the pinions 17 and 18, and these through holes 34 and 35 are formed in numbers identical to the number of the column portions 24, i.e., four in the illustrated case. Further, these through holes 34 and 35 are disposed at circumferentially intermediate points between adjacent ones of the through holes 30 and 31.

Reference numeral 37 denotes crankshafts provided in an even number of not less than four, i.e., in a number (four) identical to those of the through holes 34 and 35 in the illustrated case, and these crankshafts 37 are arranged in such a manner as to be spaced apart from each other at equal angles in the circumferential direction. Lower end portions (one end portions) and upper end portions (other end portions) of these crankshafts 37 are rotatably supported by the base portion 22 and the end plate portion 23 of the carrier 20 by means of bearings 38 and 39, respectively. Each crankshaft 37 has in its axially central portion two eccentric portions 40 and 41 which are off-centered by an equidistance from the central axis of the crankshaft 37, and phases of these eccentric portions 40 and 41 are offset by 180 degrees in the circumferential direction. Further, these eccentric portions 40 and 41 are respectively inserted in the through holes 34 and 35 of the pinions 17 and 18 with roller bearings 42 interposed therebetween.

In addition, when these crankshafts 37 rotate about their central axes, the eccentric portions 40 and 41 eccentrically rotate in the through holes 34 and 35, and cause the pinions 17 and 18 to eccentrically rotate (revolve) in a state in which their phases are offset by 180 degrees. At this time, since the number of the internal tooth pins 13 and the numbers of the external teeth 17a and 18a are slightly different (since the numbers of the external teeth 17a and 18a are smaller than the number of the internal tooth pins 13 by one in the illustrated case), the carrier 20 is rotated at a low speed by the eccentric rotation of the pinions 17 and 18.

Figure 5:
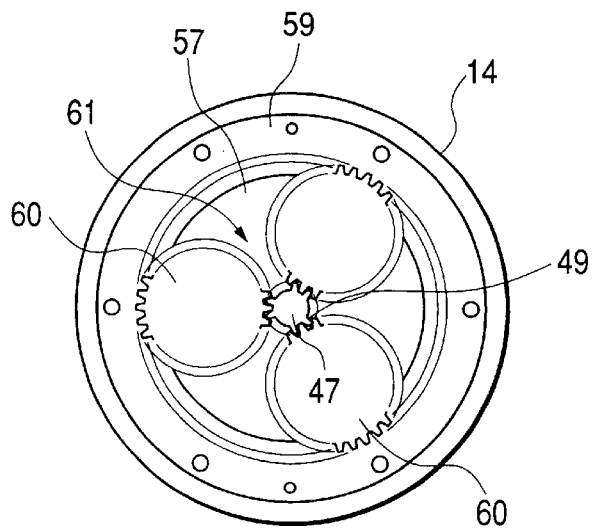
FIG. 5 is a cross-sectional view taken in the direction of the arrows along line C—C of FIG. 1.

In FIGS. 1 and 5, reference numeral 45 denotes a drive motor which is fixed to an upper end of the extension 14a of the outer casing 15, and an intermediate shaft 47 which is passed through the center of the aforementioned upper cover 14 is connected to a lower end of an output shaft 46 extending vertically from the drive motor 45. Further, a bearing 48 is interposed between this intermediate shaft 47 and the upper cover 14, thereby allowing the intermediate shaft 47 to be rotatably supported by the upper casing 15. Further, a sun gear 49 constituted by an external gear is formed at a lower end portion of this intermediate shaft 47. In addition, oil seals 50 and 51 serving as seal members are respectively interposed between the intermediate shaft 47 and the outer casing 15 (upper cover 14) and between a lower end of the outer casing 15 (cylinder 11) and the base portion 22 of the carrier 20. Consequently, a sealed space 52 is formed in the outer casing 15, and a lubricating oil 53 is filled in this sealed space 52. It should be noted that reference numeral 15a denotes an inlet for the lubricating oil 53 formed in the outer casing 15, and this inlet 15a is closed by a detachable cap 54.

Reference numeral 55 denotes a rotating shaft disposed immediately below the intermediate shaft 47 while maintaining a coaxial relationship with the intermediate shaft 47. A lower end portion of this rotating shaft 55 is rotatably supported by the end plate portion 23 of the carrier 20 by means of a bearing 56. Numeral 57 denotes a disk-shaped connecting member attached to an upper end portion of the rotating shaft 55, and a plurality of pins 58 spaced apart from each other in the circumferential direction are fixed to this connecting member 57.

Reference numeral 59 denotes an internal gear fixed to an inner periphery of the upper cover 14 opposing the sun gear 49, and a plurality of planetary gears 60 supported rotatably by the pins 58 mesh with this internal gear 59 and the sun gear 49. As a result, the rotation of the output shaft 46 is subjected to speed reduction by a planetary reduction gear mechanism 61 consisting of the intermediate shaft 47 having the sun gear 49, the connecting member 57, the pins 58, the internal gear 59, and the planetary gears 60, and is then transmitted to the rotating shaft 55. The above-described intermediate shaft 47 and rotating shaft 55 as a whole constitute an input shaft 62, and the aforementioned planetary reduction gear mechanism 61 serving as a front-stage reduction gear is interposed midway on this input shaft 62.

Figure 6:
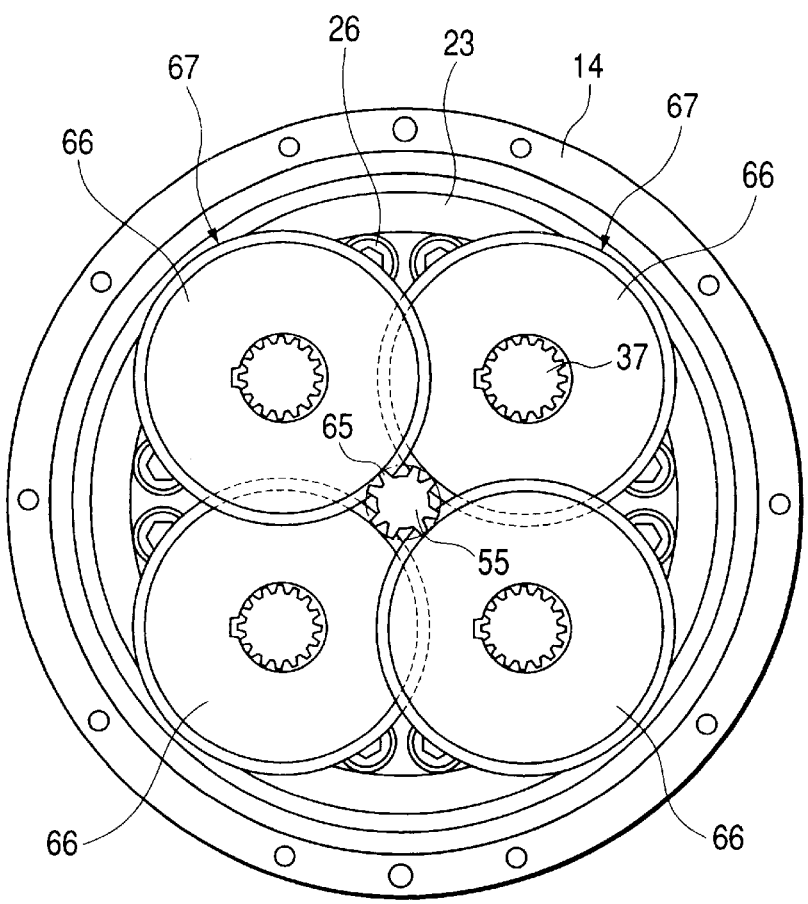
FIG. 6 is a cross-sectional view taken in the direction of the arrows along line D—D of FIG. 1.

In FIGS. 1, 2, and 6, the input shaft 62, specifically the rotating shaft 55, has a driving external gear 65 at its lower end portion, and a plurality of (four) driven external gears 66, which mesh with the driving external gear 65 while surrounding it, are arranged around this driving external gear 65. Here, these driven external gears 66 are mounted on upper end portions of the respective crankshafts 37, with the result that these driven external gears 66 are arranged in such a manner as to be spaced apart from each other at equal angles, by 90 degrees in the illustrated case, in the circumferential direction.

The driven external gears 66 are classified into a plurality of (two) paired-gear groups (pairs) 67, and each paired-gear group 67 consists of two driven external gears 66 spaced apart from each other by 180 degrees in the circumferential direction. Further, axial positions of the two driven external gears 66 making up each paired-gear group 67 with respect to the input shaft 62 are made identical; namely, these two driven external gears 66 mesh with the driving external gear 65 at the same axial position. On the other hand, the different paired-gear group 67 is arranged by being offset in the axial direction of the input shaft 62 (the driven external gears 66 belonging to the different paired-gear group 67 mesh with the driving external gear 65 at an axially spaced-apart position). Further, the driven external gears 66 of these two paired-gear groups 67 are spaced apart from each other by 90 degrees in the circumferential direction.

The aforementioned outer casing 15, pinions 17 and 18, carrier 20, crankshafts 37, input shaft 62, driving external gear 65, and driven external gears 66 as a whole constitute an eccentric oscillating-type speed reducer 69. This eccentric oscillating-type speed reducer 69 is disposed vertically so that the input shaft 62 is located on the upper side.

Internal parts of the eccentric oscillating-type speed reducer 69, e.g., the pinions 17 and 18, the bearings 21, the crankshafts 37, and the like, are lubricated by the aforementioned lubricating oil 53. In this embodiment, however, as will be explained later, the bearing 48 and the oil seal 50 are also lubricated by this lubricating oil 53, so that a lubricating device for lubricating the bearing 48 and the oil seal 50 or the operation for replenishing the lubricating oil are made unnecessary.

Namely, the arrangement provided is such that a portion of the upper wall (upper cover 14) of the outer casing 15 where the input shaft 62 is passed through is made to protrude upward, whereby this protruding portion 71 (an upper end portion of the sealed space 52) is located upwardly of the bearing 48 and the oil seal 50 between the input shaft 62 and the upper cover 14, and the oil level 53a of the lubricating oil 53 filled in the sealed space 52 is made to rise up to the protruding portion 71, i.e., is made to be located upwardly of the bearing 48 and the oil seal 50. The bearing 48 and the oil seal 50 are thereby lubricated.

In addition, in this embodiment, air is injected between the oil level 53a of the lubricating oil 53 and the upper wall (protruding portion 71) of the outer casing 15 to form an air reservoir 72. As a result, even if the eccentric oscillating-type speed reducer 69 is operated continuously for a long time, and the temperature of the eccentric oscillating-type speed reducer 69 rises and causes the lubricating oil 53 in the sealed space 52 to expand, this expansion is absorbed by the compression of the air in the air reservoir 72. Consequently, it is possible to prevent the leakage of the lubricating oil 53 from the eccentric oscillating-type speed reducer 69.

Reference numeral 75 denotes a transmission gear which is fixed to the carrier 20, specifically the base portion 22 projecting downward from the lower end of the outer casing 15. This transmission gear 75 meshes with an external gear which is fixed to a pivot of a wind-power generating facility. Further, the rotation of the drive motor 45, which has been subjected to speed reduction by the above-described planetary reduction gear mechanism 61 and the eccentric oscillating-type speed reducer 69, is transmitted to the aforementioned pivot so as to allow a generator having the pivot and blades to swivel within a horizontal plane in correspondence with the wind direction, thereby improving the generating efficiency.

Next, a description will be given of the operation of the embodiment of the invention.

It is now assumed that the wind direction has changed and an anemoscope has rotated, and that a control signal corresponding to this rotation has been outputted from a control means to the drive motor 45. At this time, although the output shaft 46 of the drive motor 45 rotates by an amount corresponding to the control signal, the rotation of this output shaft 46 is subjected to speed reduction by the planetary reduction gear mechanism 61, and is then transmitted to the rotating shaft 55 to rotate the rotating shaft 55.

Next, the rotation of this rotating shaft 55, after being subjected to speed reduction by the driving external gear 65 and the driven external gears 66, is transmitted to the crankshafts 37, and the rotatively driving force transmitted to these crankshafts 37 causes the pinions 17 and 18 to undergo eccentrically revolving motion in the outer casing 15, as described above. As a result, the speed of the rotation of the input shaft 62 is substantially reduced, and is transmitted from the transmission gear 75 to the pivot of the wind-power generating facility so as to swivel the generator within the horizontal plane so that the generating efficiency becomes maximum.

Here, as described above, the driven external gears 66 are classified into the plurality of paired-gear groups 67 each consisting of two driven external gears 66 spaced apart by 180 degrees in the circumferential direction, and the axial positions of the two driven external gears 66 making up each paired-gear group 67 with respect to the input shaft 62 are made identical, while the different paired-gear group 67 is arranged by being offset in the axial direction of the input shaft 62. Therefore, only the two driven external gears 66 making up each paired-gear group 67 are present at an identical axial position of the input shaft 62. Consequently, even if the diameters of these driven external gears 66 are made large up to the very limit, these driven external gears 66 do not interfere with each other. Accordingly, it is possible to readily enlarge the reduction ratio based on the driving external gear 65 and the driven external gears 66, with the result that it is possible to substantially enlarge the final reduction ratio without lowering the final output torque in the eccentric oscillating-type speed reducer 69. For example, in the case where the number of the crankshafts 37 is four as in this embodiment, the reduction ratio based on the driving and driven external gears 65 and 66 can be increased up to 5.3.

Figure 7:
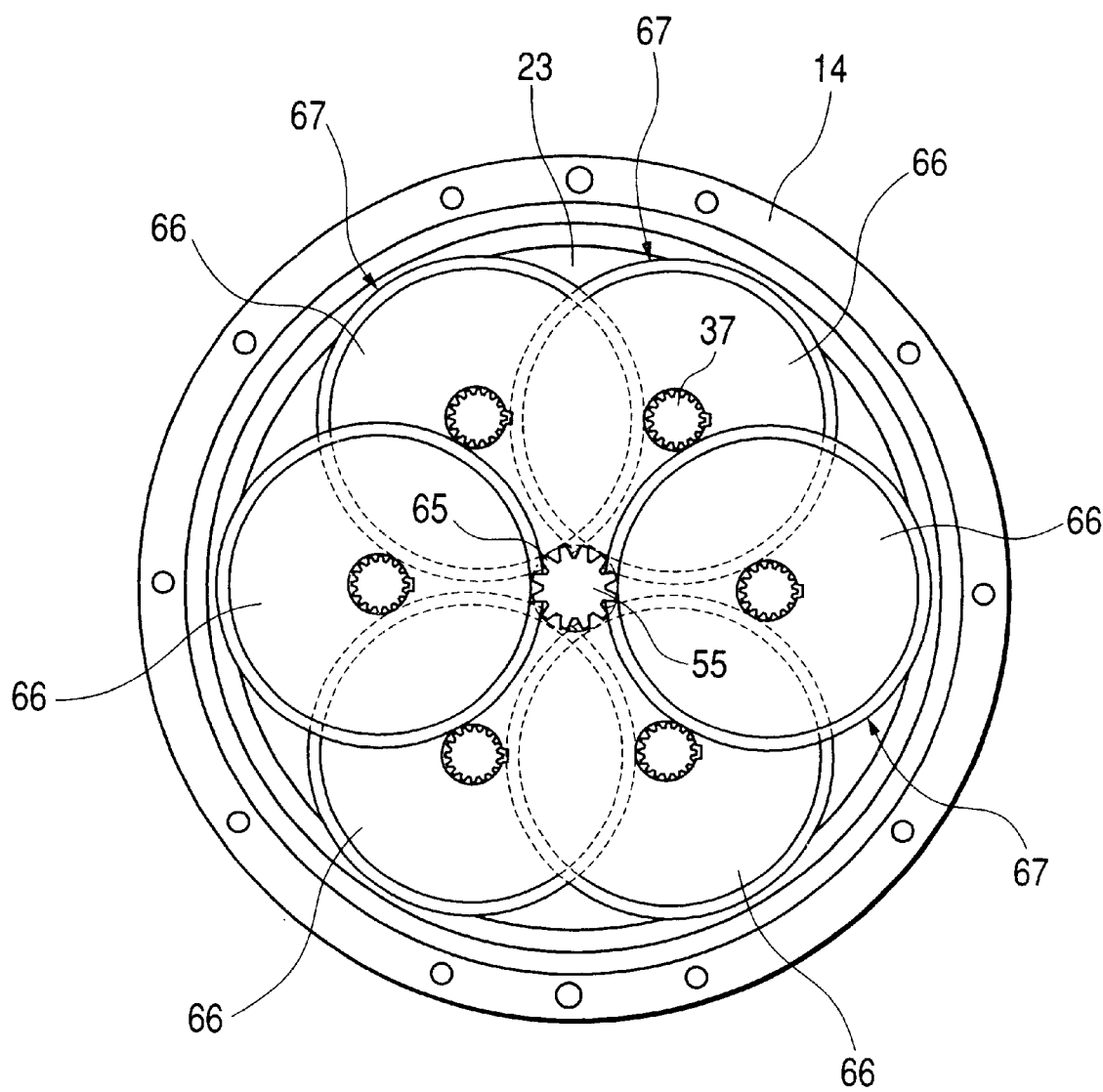
FIG. 7 is a cross-sectional view similar to that of FIG. 6 and illustrates another embodiment of the invention.

It should be noted that although in the above-described embodiment a total of four driven external gears 66 consisting of two paired-gear groups 67 are provided, in this invention a total of six driven external gears 66 consisting of three paired-gear groups 67 may be provided, as shown in FIG. 7. In this case, the paired-gear groups 67 are spaced apart from each other by 60 degrees in the circumferential direction, while being offset from each other in three stages in the axial direction of the input shaft 62.

In addition, although in the above-described embodiment the outer casing 15 is set as the fixed side while the carrier 20 is set as the rotating side so as to output a low-speed rotation from the carrier 20 which is the rotating side, in this invention the carrier may be set as the fixed side while the outer casing maybe set as the rotating side so as to output a low-speed rotation from the outer casing which is the rotating side.

As described above, in accordance with the invention, it is possible to make a final speed reduction ratio and a final output torque substantially large by enlarging the reduction ratio based on the driving and driven external gears.

What is claimed is:

1. An eccentric oscillating-type speed reducer comprising:
    an outer casing having internal teeth formed on an inner periphery thereof;
    a plurality of pinions which are accommodated in the outer casing, which have on outer peripheries thereof external teeth meshing with the internal teeth, the number of the external teeth being slightly smaller than that of the internal teeth, and which are juxtaposed in parallel in an axial direction;
    an even number, not less than four, of crankshafts which are spaced apart from each other at equal angles in a circumferential direction, central portions of the crankshafts being inserted in the pinions, so as to eccentrically rotate the pinions as the crankshafts rotate;
    a carrier which is inserted in the outer casing for rotatably supporting both end portions of the crankshafts;
    an input shaft supported rotatably by the outer casing and having a driving external gear coaxial with the internal teeth; and
    driven external gears respectively mounted on the crankshafts and meshing with the driving external gear while surrounding the driving external gear, wherein:
        the driven external gears are classified into a plurality of paired-gear groups, each group consisting of two driven external gears spaced apart from each other by 180 degrees in the circumferential direction; and
        axial positions of the two driven external gears of the same group with respect to the input shaft are made identical, while the driven external gears of different groups are offset from each other in the axial direction of the input shaft.

2. The eccentric oscillating-type speed reducer according to claim 1, wherein:
    the carrier includes:
        a base portion located on one side of the pinions;
        an end plate portion located on another side of the pinions;
        a plurality of column portions formed integrally with the base portion and extending toward the end plate portion, central portions of the column portions being passed through the pinions; and
        a plurality of bolts which are respectively screwed into holes formed in the column portions and the base portion so as to fasten the end plate portion to the column portions,
        a tip of each of the bolts is located closer to a base portion side than a proximal end of each of the column portions, and a space formed between a bottom of each of the holes and the tip of each of the bolts is located in the base portion.

3. The eccentric oscillating-type speed reducer according to claim 1, wherein:
    the eccentric oscillating-type speed reducer is disposed vertically so that the input shaft is located on an upper side;
    bearings and seal members are interposed between the outer casing and the carrier and between the outer casing and the input shaft, respectively, so as to form in the outer casing a sealed space which is filled with a lubricating oil; and
    a portion of an upper wall of the outer casing through which the input shaft is passed is located upwardly of the bearing and the seal member interposed between the outer casing and the input shaft, thereby causing an oil level of the lubricating oil to be located upwardly of the bearing and the seal member interposed between the outer casing and the input shaft.

4. The eccentric oscillating-type speed reducer according to claim 3, wherein an air reservoir which, when the lubricating oil expands, absorbs the expansion is provided between the oil level of the lubricating oil and the upper wall of the outer casing.

5. The eccentric oscillating-type speed reducer according to claim 1, wherein a transmission gear meshing with a gear fixed to a pivot of a wind-power generating facility is provided on the carrier.

6. The eccentric oscillating-type speed reducer according to claim 2, wherein a transmission gear meshing with a gear fixed to a pivot of a wind-power generating facility is provided on the carrier.

7. The eccentric oscillating-type speed reducer according to claim 3, wherein a transmission gear meshing with a gear fixed to a pivot of a wind-power generating facility is provided on the carrier.

8. The eccentric oscillating-type speed reducer according to claim 4, wherein a transmission gear meshing with a gear fixed to a pivot of a wind-power generating facility is provided on the carrier.

* * * * *